Patented Feb. 2, 1943

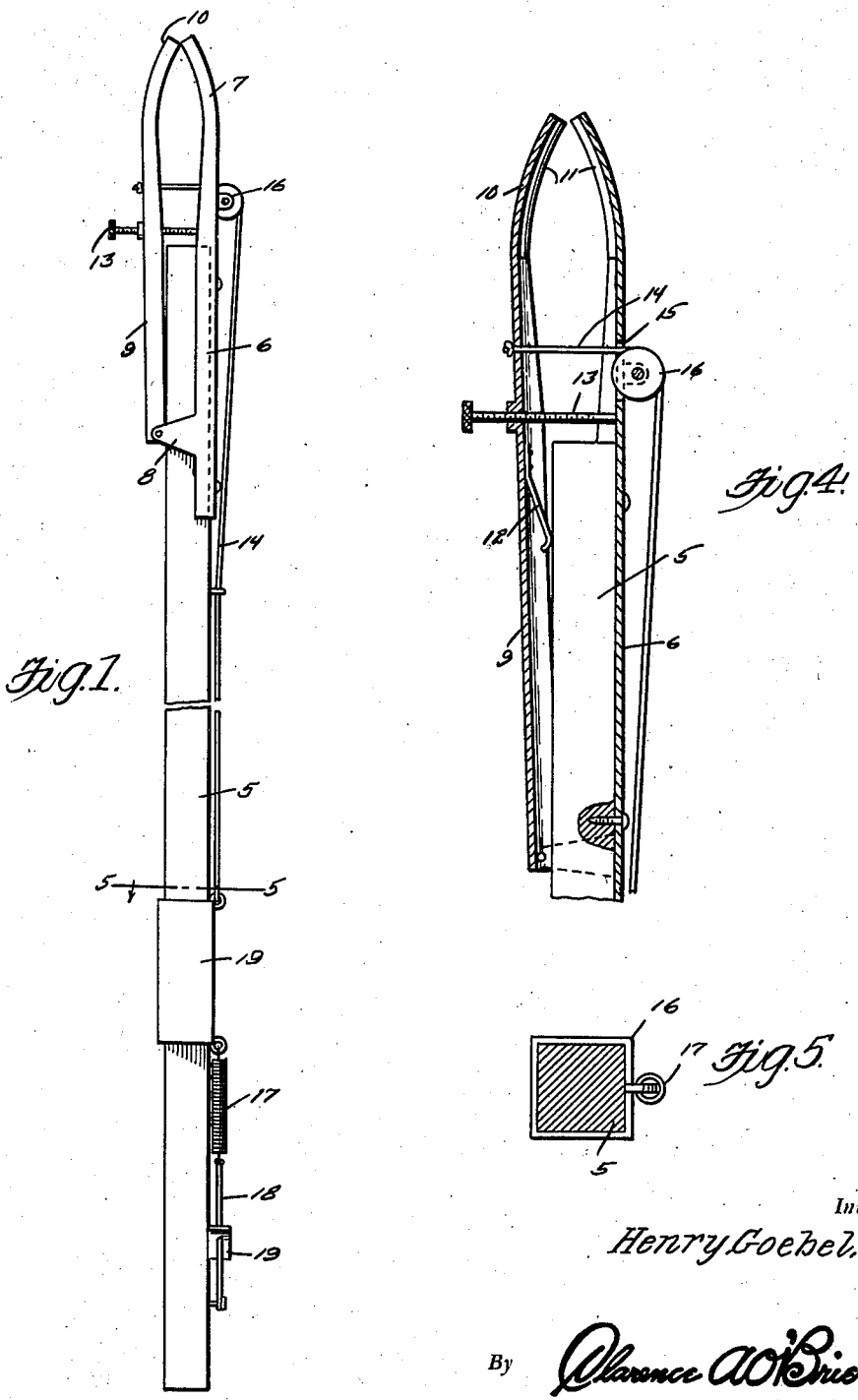

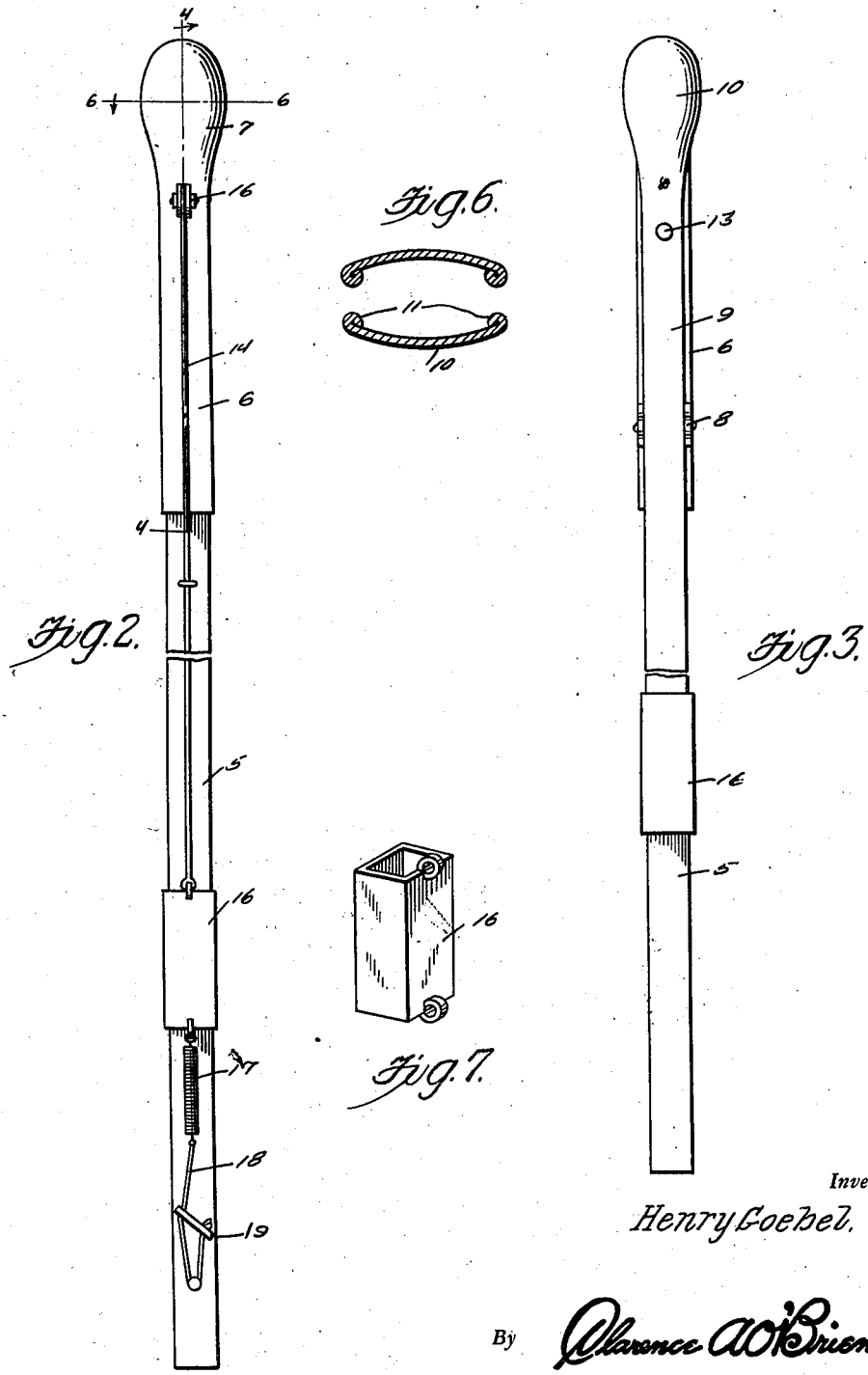

2,309,948

UNITED STATES PATENT OFFICE 2,309,948

FRUIT PICKER

Henry Goebel, Vista, Calif.

Application July 30, 1941, Serial No. 404,702

4 Claims. (Cl. 56—333)

This invention relates to fruit pickers, and has for the primary object the provision of a device of this character which may be economically constructed and sold at a low cost and will provide an efficient picker for various kinds of fruit and may be easily and conveniently operated without danger of bruising or otherwise damaging the fruit.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which—

Figure 1 is a side elevation illustrating a fruit picker constructed in accordance with my invention.

Figure 2 is a view similar to Figure 1 taken at right angles thereto.

Figure 3 is a view similar to Figure 2 showing the opposite side of the picker from that shown in Figure 2.

Figure 4 is a sectional view taken on the line 4—4 of Figure 2.

Figure 5 is a sectional view taken on the line 5—5 of Figure 1.

Figure 6 is a sectional view taken on the line 6—6 of Figure 2.

Figure 7 is a perspective view illustrating a slidable operating sleeve.

Referring in detail to the drawings, the numeral 5 indicates a pole which may be of any desired length and includes a handle end and a work end and secured and projecting beyond the latter-named end is a jaw shank 6 on which is formed a relatively fixed jaw 7. The shank 6 has formed thereon spaced ears 8 which straddle the pole and have pivoted thereto a shank 9 of a movable jaw 10. The jaws 7 and 10 are of substantially spoon shape having rounded edges 11.

A leaf spring 12 is fixed on the shank 9 of the movable jaw and bears against the pole 5 for urging the movable jaw away from the relatively fixed jaw so that fruit may move into and out of the space between the jaws. A set screw 13 is threaded in the shank 9 of the movable jaw and may come to rest against the shank of the relatively fixed jaw for limiting the movement of the movable jaw toward the relatively fixed jaw for the purpose of preventing crushing of fruit grasped by the jaws.

A flexible element 14 is secured to the shank 9 of the movable jaw and extends through an opening 15 in the shank of the relatively fixed jaw and passes over a pulley 16 journaled on the shank 6 and is connected to an operating sleeve 16' slidably mounted on the pole. A spring 17 is connected to the sleeve 16' and adjustably connected to the pole by a flexible element 18 and an adjustable securing means 19 whereby the tension of the spring may be varied.

The spring 17 acts to move the sleeve 16' in a direction of bringing the jaws toward each other and in order that the jaws may spread apart the sleeve 16' is manually moved in an opposite direction to permit the jaws to be placed over fruit.

As the sleeve 16' is released it slides under the action of the spring 17 bringing the movable jaw toward the relatively fixed jaw gripping the fruit so that a combined twist and pull on the fruit will remove the latter from the tree without danger of bruising or otherwise damaging the fruit.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a fruit picker, a pole, a relatively fixed jaw secured to said pole, a movable jaw pivoted to the relatively fixed jaw, spring means on the movable jaw and bearing against the pole for urging the movable jaw away from the relatively fixed jaw, means for limiting the movement of the movable jaw toward the relatively fixed jaw, a pulley carried by the relatively fixed jaw, a flexible element secured to the movable jaw and trained over said pulley, an operating sleeve having the flexible element secured thereto and slidable on the pole, and spring means connected to the sleeve and to the pole.

2. In a fruit picker, a pole, a relatively fixed jaw secured to said pole, a movable jaw pivoted to the relatively fixed jaw, spring means on the movable jaw and bearing against the pole for urging the movable jaw away from the relatively fixed jaw, means for limiting the movement of the movable jaw toward the relatively fixed jaw, a pulley carried by the relatively fixed jaw, a flexible element secured to the movable jaw and trained over said pulley, an operating sleeve having the flexible element secured thereto and slidable on the pole, and a spring connected to the sleeve and adjustably connected to the pole.

3. In a fruit picker, a pole, a shank secured to the pole, a relatively fixed spoon-shaped jaw formed on said shank, a second shank pivoted to the first shank, a spoon-shaped movable jaw integral with the second-named shank, a set screw carried by the second shank to abut the first shank for limiting the movement of the movable jaw toward the fixed jaw, spring means acting on the second shank to move the movable jaw away from the fixed jaw, a pulley carried by the first shank and the latter having an opening, a flexible element trained over said pulley and extending through the opening and secured to the second shank, a sleeve slidable on the pole and having the flexible element connected thereto, a spring connected to the sleeve, and an adjustable flexible connecting means between the spring and the pole.

4. A fruit picker of the class described comprising an elongated pole rectangular in cross-sectional form, a relatively stationary jaw member embodying a channel-shaped shank partially embracing and fixed to the outer end of the pole, said shank being provided at its inner end with a pair of parallel ears having their free ends projecting beyond that face of the pole remote to the point of attachment of the shank, the outer end portion of the jaw member projecting beyond the adjacent end of the pole and being longitudinally and transversely curved, a relatively movable jaw member having a channel-shaped shank opposed in parallelism to the last-named face of the pole and pivotally connected with said ears, the outer end of said movable jaw member corresponding to the companion end of the first-named stationary jaw member, a leaf spring attached to the intermediate portion of the movable jaw member and having its free end bearing against the pole, a set-screw carried by said movable jaw member and engageable with the shank portion of the stationary jaw member at a point beyond the outer end of the pole, a pulley on the stationary jaw member, a flexible element secured to the relatively movable jaw member and trained over the pulley, a rectangular sleeve slidable on the pole, the free end of the flexible element being connected with said sleeve, a coiled spring also connected with the sleeve, and manually regulated adjusting means connected with the spring and anchored on the pole within the vicinity of the spring.

HENRY GOEBEL.